(No Model.)
J. MARTIN.
COFFIN LID FASTENER.
No. 281,382. Patented July 17, 1883.
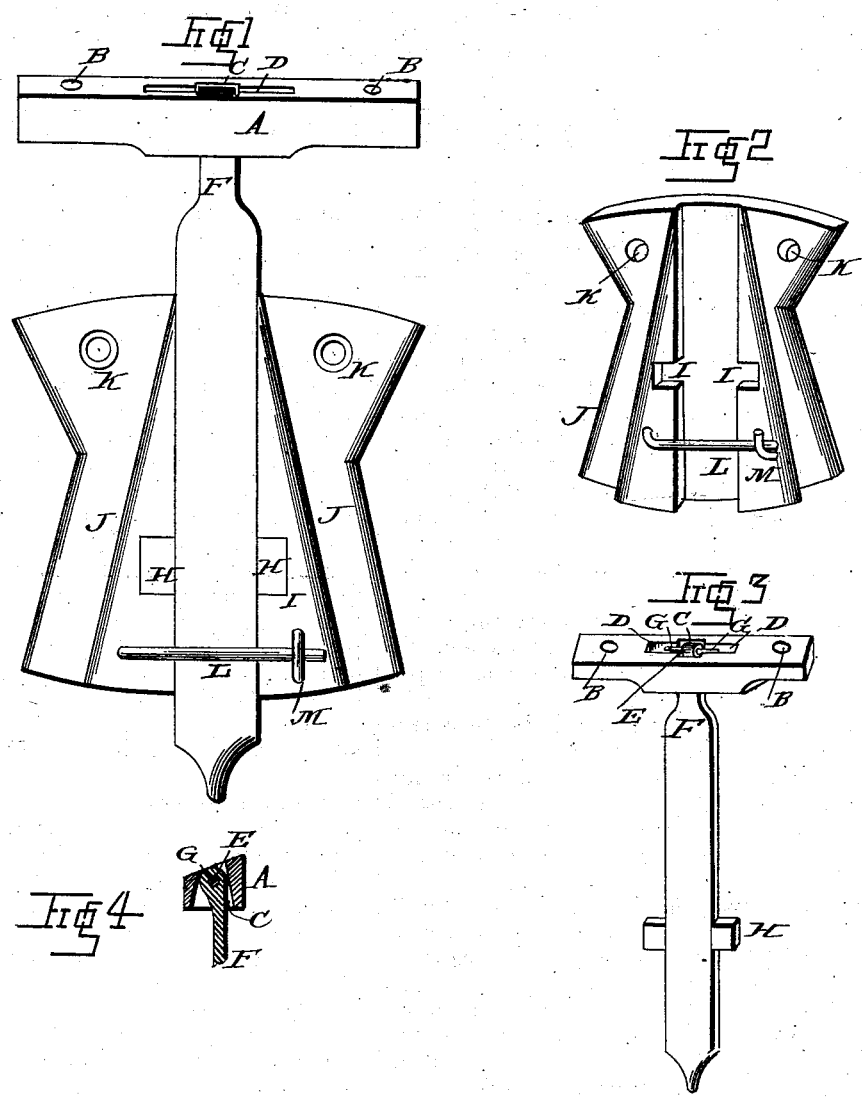
WITNESSES:
Fred. G. Dieterich
Jno. G. Hinkel
James Martin,
INVENTOR.
By Louis Bagger & Co
ATTORNEYS

UNITED STATES PATENT OFFICE.

JAMES MARTIN, OF MARTIN'S MILLS, TENNESSEE, ASSIGNOR OF TWO-THIRDS TO WILLIAM H. MARTIN AND JAMES H. MIDDLETON, BOTH OF SAME PLACE.

COFFIN-LID FASTENER.

SPECIFICATION forming part of Letters Patent No. 281,382, dated July 17, 1883.

Application filed February 13, 1883. (No model.)

*To all whom it may concern:*

Be it known that I, JAMES MARTIN, of Martin's Mills, in the county of Wayne and State of Tennessee, have invented certain new and useful Improvements in Coffin-Fasteners; and I do hereby declare that the following is a full, clear, and exact description of the invention, which will enable others skilled in the art to which it appertains to make and use the same, reference being had to the accompanying drawings, which form a part of this specification, and in which—

Figure 1 is a front view of my improved coffin-fastener, and Figs. 2, 3, and 4 are detail views of the several parts of the same separated.

Similar letters of reference indicate corresponding parts in all the figures.

My invention has relation to fasteners for coffin-lids; and it consists in the improved construction and combination of parts of the same, as hereinafter more fully described and claimed.

In the accompanying drawings, the letter A indicates an oblong plate, which is fastened to the under side of the coffin-lid by means of screws inserted through screw-holes B. From the outer side of this plate passes, in the middle of the plate, a transverse recess, C, becoming narrower toward the upper side, where it extends longitudinally, forming a recess, D. Through this recess passes the narrow eye E of a bar, F, which is secured by a pin, G, passing through the eye and resting in the recess D.

Near the lower end of the bar F is a cross-piece, H, doweled or otherwise fastened upon it, and the lower end of the bar is pointed or ornamented to form a projecting point for raising it out of a recess, I, in the plate J, which is fastened upon the side of the coffin by means of screws inserted in holes K. The recess I is shaped corresponding to the cross shape of the bar and cross-piece, and the bar and cross-piece are held in place in the recess by means of a turn-button, L, fastened upon one side of the recess, and engaging with its free end under a hook, M, upon the other side.

It will thus be seen that the locking-bar F H will be held firmly in place in the recess, its shape and that of the recess preventing it from slipping upward, and the turn-button preventing it from swinging out; and, also, that by the mode of hinging it to plate A and by the general construction of the parts of the fastener it is very simple and inexpensive in make, and at the same time effectual in operation.

Having thus described my invention, I claim and desire to secure by Letters Patent of the United States—

The herein-described coffin-fastener, consisting of the plate A, having tranverse decreasing recess C, and longitudinal recess D, bar F, having eye E for the insertion of pin G, and cross-piece H, and plate J, having recess I adapted to receive part of the locking-bar F H, and having turn-button L and hook M, all constructed and combined as and for the purpose shown and set forth.

In testimony that I claim the foregoing as my own I have hereunto affixed my signature in presence of two witnesses.

JAMES MARTIN.

Witnesses:
CHARLES L. NORMAN,
HENRY A. HELTON.